(12) United States Patent
Zhou et al.

(10) Patent No.: US 11,711,017 B2
(45) Date of Patent: Jul. 25, 2023

(54) ADAPTER AND CONTROL METHOD THEREOF

(71) Applicant: Delta Electronics (Shanghai) CO., LTD, Shanghai (CN)

(72) Inventors: Jian Zhou, Shanghai (CN); Haibin Song, Shanghai (CN); Daofei Xu, Shanghai (CN); Jinfa Zhang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 115 days.

(21) Appl. No.: 17/158,278

(22) Filed: Jan. 26, 2021

(65) Prior Publication Data

US 2021/0313889 A1    Oct. 7, 2021

(30) Foreign Application Priority Data

Apr. 3, 2020    (CN) .......................... 202010258177.7

(51) Int. Cl.
  *H02M 3/158*    (2006.01)
  *H02J 1/00*    (2006.01)
  *H02M 3/335*    (2006.01)

(52) U.S. Cl.
  CPC ............. *H02M 3/1582* (2013.01); *H02J 1/00* (2013.01); *H02M 3/3353* (2013.01)

(58) Field of Classification Search
  CPC ....... H02M 3/1582; H02M 3/3353; H02J 1/00
  USPC ....................................................... 323/259
  See application file for complete search history.

(56) References Cited

U.S. PATENT DOCUMENTS

| 4,847,742 A | 7/1989 | Ohashi et al. |
| 5,400,239 A | 3/1995 | Caine |
| 6,462,962 B1 | 10/2002 | Cuk |
| 6,504,267 B1 | 1/2003 | Giannopoulos |
| 6,549,432 B1 * | 4/2003 | Giannopoulos ... H02M 3/33561 363/21.14 |
| 6,552,917 B1 | 4/2003 | Bourdillon |
| 6,813,163 B2 | 11/2004 | Inoue et al. |

(Continued)

FOREIGN PATENT DOCUMENTS

| CN | 1582525 A | 2/2005 |
| CN | 101548457 A | 9/2009 |

(Continued)

OTHER PUBLICATIONS

The Extended European Search Report dated Jul. 27, 2021 for EP patent application No. 21166411.5.

(Continued)

*Primary Examiner* — Yemane Mehari
(74) *Attorney, Agent, or Firm* — Qinghong Xu

(57) ABSTRACT

The present disclosure relates to an adapter. The adapter includes an input port, a first output port and a second output port, and the adapter further includes: a rectifier circuit having an input terminal being connected to the input port of the adapter; a bus capacitor connected to an output terminal of the rectifier circuit in parallel; a first flyback converter having an input terminal connected to the bus capacitor and an output terminal coupled to the first output port; and a second flyback converter having an input terminal connected to the bus capacitor and an output terminal coupled to the second output port.

20 Claims, 11 Drawing Sheets

(56) References Cited

U.S. PATENT DOCUMENTS

| | | | |
|---|---|---|---|
| 7,092,259 B2 | 8/2006 | Jacobs | |
| 7,538,527 B2 | 5/2009 | O'Driscoll et al. | |
| 2003/0086279 A1 | 5/2003 | Bourdillon | |
| 2006/0181230 A1 | 8/2006 | Hosotani et al. | |
| 2008/0009145 A1 | 1/2008 | Zhou | |
| 2008/0058028 A1 | 3/2008 | Nakayama | |
| 2011/0018344 A1 | 1/2011 | Liao et al. | |
| 2013/0127248 A1* | 5/2013 | Lai | H02J 9/005 307/31 |
| 2013/0148388 A1 | 6/2013 | Yang | |
| 2014/0347005 A1* | 11/2014 | Zhou | H02J 7/007 320/137 |
| 2015/0015071 A1 | 1/2015 | Deboy | |
| 2016/0359426 A1 | 12/2016 | Jitaru et al. | |
| 2017/0047838 A1 | 2/2017 | Lin | |
| 2017/0331378 A1 | 11/2017 | Song et al. | |
| 2018/0120910 A1 | 5/2018 | Farkas et al. | |
| 2018/0302981 A1 | 10/2018 | Ranganathan et al. | |
| 2019/0068062 A1 | 2/2019 | Chung et al. | |
| 2020/0091758 A1 | 3/2020 | Jahan et al. | |

FOREIGN PATENT DOCUMENTS

| | | |
|---|---|---|
| CN | 102255481 A | 11/2011 |
| CN | 103051211 A | 4/2013 |
| CN | 103731031 A | 4/2014 |
| CN | 103812334 A | 5/2014 |
| CN | 104283444 A | 1/2015 |
| CN | 106385091 A | 2/2017 |
| CN | 107592021 A | 1/2018 |
| CN | 107624210 A | 1/2018 |
| CN | 207427014 U | 5/2018 |
| CN | 109474046 A | 3/2019 |
| CN | 209088602 U | 7/2019 |
| CN | 209134305 U | 7/2019 |
| CN | 209963767 U | 1/2020 |
| JP | H07288976 A | 10/1995 |
| WO | 2016172684 A1 | 10/2016 |

OTHER PUBLICATIONS

The Extended European Search Report dated Aug. 27, 2021 for EP patent application No. 21163006.6.
Non-Final Rejection dated Mar. 31, 2022 of U.S. Appl. No. 17/212,056.
The First Office Action dated Apr. 26, 2022 of Chinese Patent No. 202010258177.7.
The First Office Action dated May 7, 2022 of Chinese Patent No. 202110292275.7.
2rd Office Action dated Jan. 28, 2023 of Chinese Application No. 2021102922757.
Non-Final Rejection dated Jan. 31, 2023 of U.S. Appl. No. 17/216,804.
Notice of Allowance dated Apr. 26, 2023 of U.S. Appl. No. 17/216,804.
3rd Office Action dated Apr. 15, 2023 of Chinese Application No. 202010258177.7.

* cited by examiner

ADAPTER AND CONTROL METHOD THEREOF

CROSS REFERENCE

This application is based upon and claims priority to Chinese Patent Application No. 202010258177.7, filed on Apr. 3, 2020, the entire content of which is incorporated herein by reference.

TECHNICAL FIELD

The present invention relates to the field of power electronics technology, in particular, to an adapter and a control method thereof.

BACKGROUND

In applications of low-power adaptors, the flyback converter is widely used because of its simple circuit structure, limited number of components, and capability of multiple outputs. In a multi-output adapter, generally two or more output ports are connected to a same flyback converter. As shown in FIG. 1, two output ports are directly connected to a flyback converter 230 through different secondary windings. A primary side of the flyback converter 230 is connected with an input port through a bus capacitor 120 and a rectifier circuit 110. In this case, a ratio of the output voltages of the two output ports is fixed which related to turns of the respective secondary windings.

Another multi-output adapter is shown in FIG. 2, one of the ports is directly connected to an output terminal of a flyback converter 230, and the other output port is connected to the flyback converter 230 through a BUCK circuit. Although this method can achieve independent control of the output voltages of the two output ports, the output voltage of the BUCK circuit cannot be higher than the output voltage of the flyback converter 230. Therefore, functions of the two output ports are not completely equivalent, and cannot meet the requirement for applications such as USB PD type-C at the same time.

In summary, how to realize independent adjustment and distribution of voltage and power of different output ports of the adapter is a technical problem that needs to be solved.

It should be noted that the information disclosed in the above Background section is only used to enhance the understanding of the background of the present invention, and therefore it may include information that does not constitute the prior art known to those of ordinary skill in the art.

SUMMARY

According to a first aspect of embodiments of the present invention, there is provided an adapter. The adapter includes an input port, a first output port and a second output port, wherein the adapter further includes a rectifier circuit having an input terminal being connected to the input port of the adapter; a bus capacitor connected to an output terminal of the rectifier circuit in parallel; a first flyback converter having an input terminal connected to the bus capacitor and an output terminal coupled to the first output port; and a second flyback converter having an input terminal being connected to the bus capacitor and an output terminal coupled to the second output port.

According to a second aspect of embodiments of the present invention, there is provided a control method for an adapter. The adapter includes an input port, a first output port and a second output port, wherein the adapter further includes a rectifier circuit having an input terminal being connected to the input port of the adapter; a bus capacitor connected to an output terminal of the rectifier circuit in parallel; a first flyback converter having an input terminal connected to the bus capacitor and an output terminal coupled to the first output port; and a second flyback converter having an input terminal connected to the bus capacitor and an output terminal coupled to the second output port, and wherein one of the first flyback converter and the second flyback converter is in operation, and the other is to be responded. The method includes according to an actual output power of the flyback converter in operation, a rated output power of the adapter, and an expected output power of the flyback converter to be responded, calculating an actual output power of the flyback converter to be responded.

It should be understood that the above general description and the following detailed description are only exemplary and explanatory, and cannot limit the present invention.

BRIEF DESCRIPTION OF THE DRAWINGS

The drawings herein are incorporated into and constitute a part of this specification, show embodiments consistent with the present invention, and are used to explain the principles of the present invention together with the specification. Obviously, the drawings in the following description are only some embodiments of the present invention. For those of ordinary skill in the art, other drawings can be obtained based on these drawings without any creative effort.

DETAILED DESCRIPTION

Figure 1:
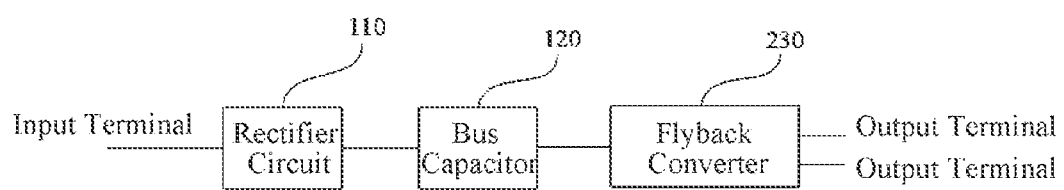
FIG. 1 is a circuit structure diagram of an adapter in the related art.
Figure 2:
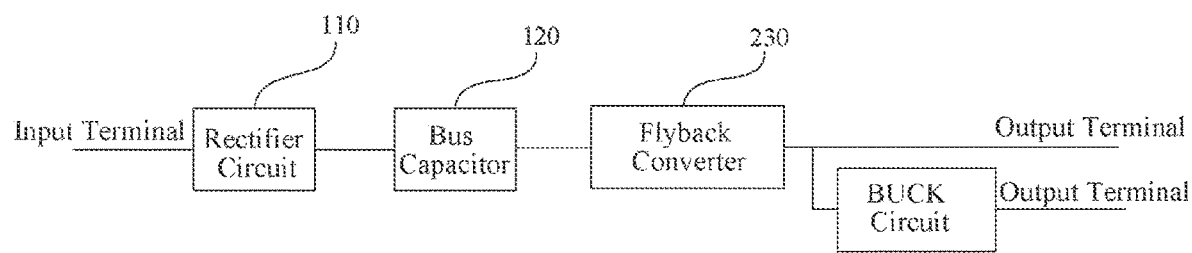
FIG. 2 is a circuit structure diagram of another adapter in the related art.

Exemplary embodiments will now be described more fully with reference to the drawings. However, the exemplary embodiments can be implemented in various forms, and should not be construed as being limited to the examples set forth herein; rather, these embodiments are provided to make the present invention more comprehensive and complete, and fully convey the ideas of the exemplary embodiments to those skilled in the art. The same reference numerals in the drawings indicate the same or similar structures, and thus the detailed description thereof will be omitted.

Although relative terms are used in this specification, such as "upper" and "lower" to describe the relative relationship between one component and another component shown in the drawings, these terms are used in this specification only for convenience, for example, in the direction of the example in the drawings. It can be understood that if the device shown is turned upside down, the component described as "upper" will become the "lower" component. When a structure is "on" another structure, it may indicate that the structure is integrally formed on the other structure, that the structure is "directly" provided on the other structure, or that the structure is provided on the other structure "indirectly" through another structure.

The terms "a", "an", "the", "said" and "at least one" are used to indicate the presence of one or more elements, components, etc.; the terms "includes", "including", "have" and "having" are used to indicate an inclusive meaning in an open sense and indicate that there may be additional elements, components, etc. in addition to the listed elements, components, etc.; the terms of "first", "second", "third", etc. are used merely as marks, but not as any limitation on the number of objects thereof.

In exemplary embodiments of the present disclosure, an adapter and a control method thereof are provided to realize independent control of output voltages and output powers of different output ports of the adapter. The adapter provided by the embodiment of the present invention includes a rectifier circuit and a bus capacitor, as well as a plurality of flyback converters. An input terminal of the rectifier circuit is connected to an input power source, and an output terminal of the rectifier circuit is connected to the bus capacitor. Furthermore, input terminals of the plurality of flyback converters are connected in parallel with each other to the bus capacitor, and an output terminal of each of the plurality of flyback converters is connected with a corresponding output port, and the output port is configured to provide power to a corresponding load.

Figure 3:
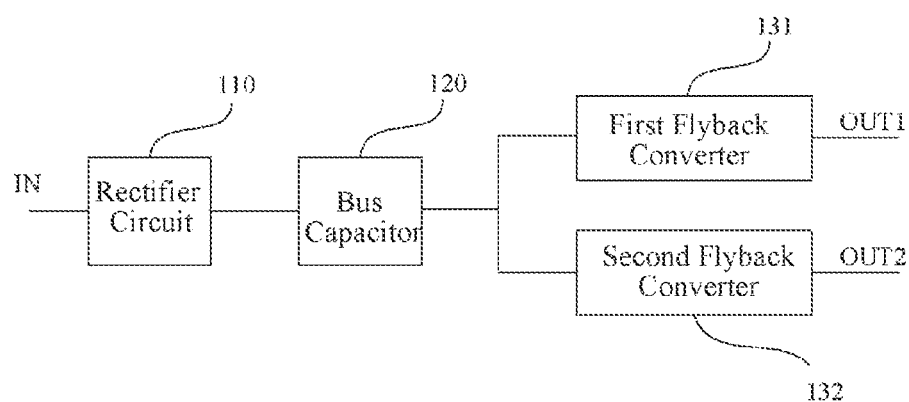
FIG. 3 is a schematic diagram of a circuit structure of an adapter according to an embodiment of the present invention.

For example, in an embodiment, as shown in FIG. 3, an adapter provided by the embodiment of the present invention includes an input port IN, a first output port OUT1, and a second output port OUT2. The adapter also includes a rectifier circuit 110, a bus capacitor 120, and a first flyback converter 131 and a second flyback converter 132. An input terminal of the rectifier circuit 110 is connected to the input port IN of the adapter, and a bus capacitor 120 is connected to an output terminal of the rectifier circuit 110. Input terminals of the first flyback converter 131 and the second flyback converter 132 are connected in parallel with each other and connected to the bus capacitor 120. An output terminal of the first flyback converter 131 is coupled to the first output port OUT1, and an output terminal of the second flyback converter 132 is coupled to the second output port OUT2.

In the embodiment of the present invention, by controlling the different flyback converters, it is possible to control the output voltages and output powers of the different output ports of the adapter, so that the adapter can be applied to more electric equipment and power consumption scenes.

In the adapter of the embodiments of the present invention, the first flyback converter 131 and the second flyback converter 132 share a set of rectifier circuit 110 and bus capacitor 120. The rectifier circuit 110 includes an Electromagnetic Interference (EMI) filter and a rectifier bridge, and the embodiment of the present invention is not limited to herein.

In the embodiment of the present invention, the adapter includes only two flyback converters, but in practical applications, it is not limited to this, and the adapter may include three or more flyback converters.

In the embodiment of the present invention, each one of the flyback converters is correspondingly coupled to an output port of the adapter, but in practical applications, it is not limited to this. In some embodiments, each one of the flyback converters can also correspondingly coupled to two or more output ports of the adapter, but in this case, the output voltages of two or more output ports of the adapter corresponding to the same flyback converter cannot be adjusted independently.

In some embodiments, a maximum output power of at least one of the first flyback converter and the second flyback converter is greater than a half of a rated output power of the adapter. In some embodiments, the maximum output powers of the first flyback converter and the second flyback converter may both greater than a half of the rated output power of the adapter. In other embodiments, the first flyback converter and the second flyback converter may also have different maximum output powers.

In some embodiments, the output voltages and the output powers of the first flyback converter 131 and the second flyback converter 132 are both adjustable and can be independently controlled. In order to reduce costs, when the adapter is applied to a situation where only one output port with variable power is required, it is also possible to design one of the flyback converters with adjustable output voltage and output power, and the output voltage of the other flyback converter is fixed. In the case that the output voltage and output power of the two flyback converters are both adjustable, the adapter can be used to provide power for more kinds of electrical equipment with different power requirements.

In some embodiments, the output voltages of the first flyback converter 131 and the second flyback converter 132 may include 5V, 9V, 12V, 15V, or 20V. The embodiment of the present invention is not limited to this. In some other embodiments, it may also include other output voltage values. Furthermore, the output voltage of the first flyback converter 131 may be greater than, equal to or less than the output voltage of the second flyback converter 132. Because the first flyback converter 131 and the second flyback converter 132 can be independently controlled, the output voltages and output powers of the first output port and the second output port of the adapter can be independently adjusted according to different electrical equipment. Wherein, when the two flyback converters work at the same time, a sum of the output powers of the two flyback converters cannot greater than the rated output power of the adapter.

Figure 4:
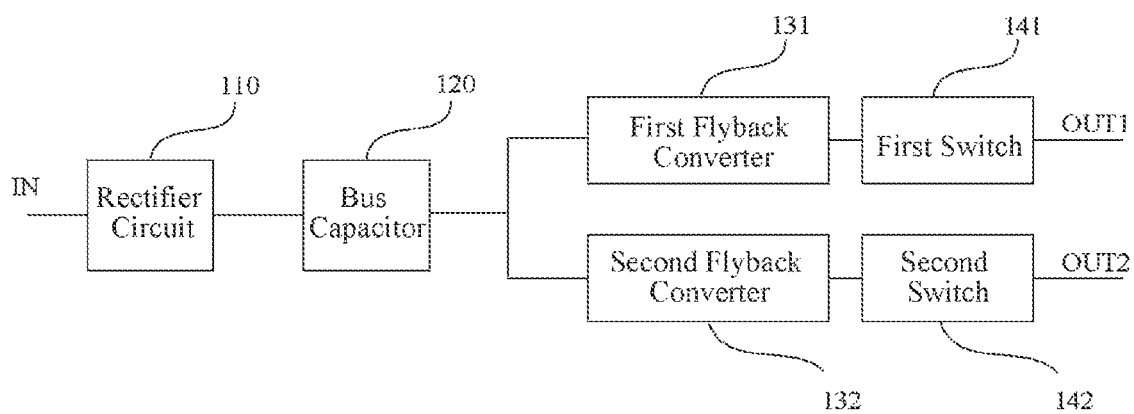
FIG. 4 is a schematic diagram of a circuit structure of an adapter according to another embodiment of the present invention.

Furthermore, in some embodiments, the output terminal of the first flyback converter is coupled to the first output port via a first switch, and the output terminal of the second flyback converter is coupled to the second output port via a second switch. For example, as shown in FIG. 4, the output terminal of the first flyback converter 131 is coupled to the first output port OUT1 via a first switch 141, and the output terminal of the second flyback converter 132 is coupled to the output terminal OUT2 via the second switch 142. In some embodiments, the first switch 141 and the second switch 142 may be MOSFETs. Furthermore, the metal oxide semiconductor field effect transistor may be a P-type MOSFET, i.e. PMOS, or may be an N-type MOSFET, i.e. NMOS.

In addition to the MOSFET, the output terminals of the first flyback converter 131 and the second flyback converter 132 can also be connected to the first output port OUT1 and the second output port OUT2 of the adapter through other semiconductor switches. The present invention is not limited here.

Figure 5:
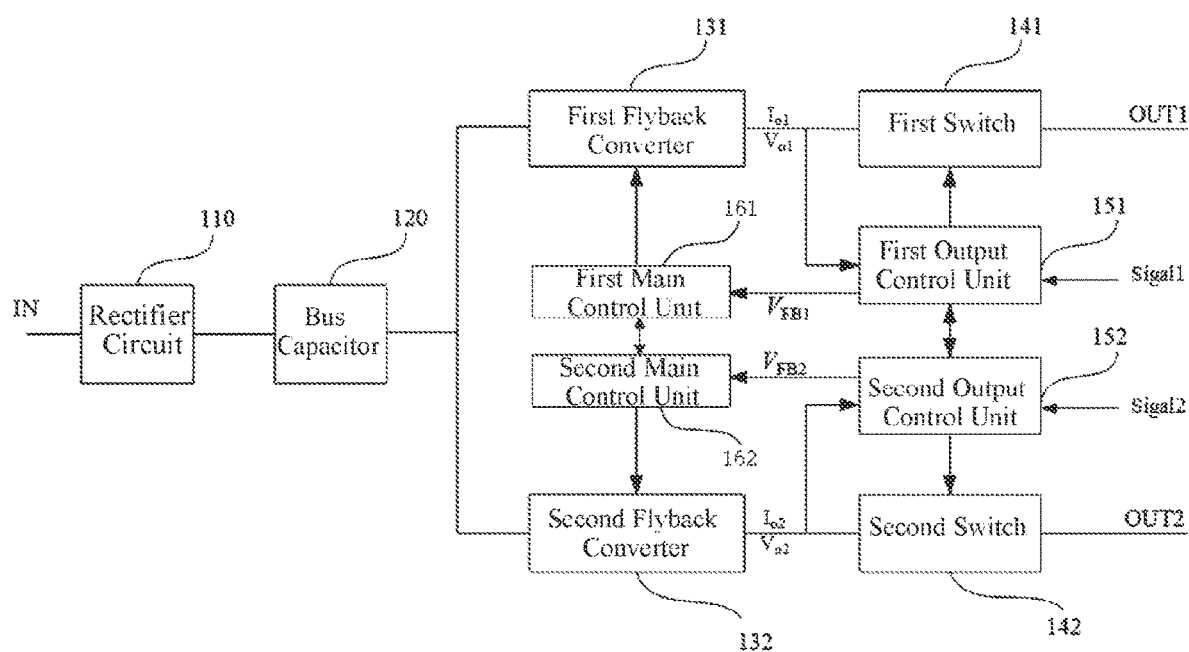
FIG. 5 is a schematic diagram of a circuit structure of an adapter according to another embodiment of the present invention.

Furthermore, the first flyback converter 131 and the second flyback converter 132 can be controlled by different main control units, and communication can also be carried out between different main control units. For example, as shown in FIG. 5, the adapter further includes a first main control unit 161 and a second output main control unit 162. The first main control unit 161 controls operations of the first flyback converter 131, and the second main control unit 162 controls operations of the second flyback converter 132.

Furthermore, the first switch 141 and the second switch 142 can be controlled by different output control units, and communication can also be carried out between the different output control units. For example, as shown in FIG. 5, the adapter further includes a first output control unit 151 and a second output control unit 152. The first output control unit 151 controls on/off of the first switch 141, the second output control unit 152 controls on/off of the second switch 142, and the first output control unit 151 and the second output control unit 152 communicate with each other and exchange operating information of their corresponding flyback converters, so that both of the first output control unit 151 and the second output control unit 152 know each other's output voltage, output power and other operating status information, etc.

The communication mode between the first output control unit 151 and the second output control unit 152 can be any one of the following: SPI, I²C or USART. Alternatively, different output control units can connect by way of a half-duplex communication or a full-duplex communication via General-Purpose Input/Output (GPIO) port. It should be noted that the communication method in the present invention is not limited to here.

Herein, the first and second output control units may be integrated in the first flyback converter and the second flyback converter respectively, or may be independent of the first flyback converter and the second flyback converter respectively.

For example, as shown in FIG. 5, the first output control unit 151 and the second output control unit 152 are connected with the corresponding output terminals of the first flyback converter 131 and the second flyback converter 132 respectively, and detect the output currents and output voltages of the first flyback converter 131 and the second flyback converter 132 respectively. Further, the first output control unit 151 also receives a first load signal Signal1 reflecting a first load demand, and generates a first output voltage reference according to the first load signal Signal1. Furthermore, the first output control unit 151 generates a first feedback signal VFB1 according to the first output voltage reference and the detected first output voltage Vo1 and outputs the first feedback signal VFB1 to the first main control unit 161. The first main control unit 161 controls the first flyback converter 131 according to the first feedback signal VFB1. Similarly, the second output control unit 152 also receives a second load signal Signal2 reflecting a second load demand, and generates a second output voltage reference according to the second load signal Signal2. Furthermore, the second output control unit 152 generates a second feedback signal VFB2 according to the second output voltage reference and the detected second output voltage Vo2 and outputs the second feedback signal VFB2 to the second main control unit 162, so that the second main control unit 162 can control the second flyback converter 132 according to the second feedback signal VFB2.

Furthermore, the first output control unit 151 and the second output unit 152 also control on/off of the first switch 141 and the second switch 142, respectively. In some embodiments, the first output control unit 151 controls the on/off of the first switch 141 according to the first output current Io1, and the second output control unit 152 controls the on/off of the second switch 142 according to the second output current Io2. When the first switch 141 or the second switch 142 is turned-on, the output port of the adapter is connected to the corresponding flyback converter; and when the first switch 141 or the second switch 142 is turned off, the output port of the adapter is disconnected from the corresponding flyback converter.

In some embodiments, in the case that a load needs to be connected to the first output port OUT1, the first output control unit 151 can control the first switch 141 to be turned off firstly, and then control the first switch 141 to be turned on when the output voltage of the first flyback converter 131 is adjusted to a required output voltage for the load. Similarly, in the case that a load needs to be connected to the second output port OUT2, the second output control unit 152 can control the second switch 142 to be turned off firstly, and then control the second switch 142 to be turned on when the output voltage of the second flyback converter 132 is adjusted to a required output voltage for the load.

In some embodiments, the first output port and the second output port may be USB Type C interfaces. Furthermore, in some embodiments, the first output port and the second output port may meet requirements of USB PD Type-C. That is, devices with USB Type-C ports have an open fast charging standard called USB Power Delivery (USB-PD).

In some other embodiments, the first output control unit 151 may also generate a first feedback signal VFB1 according to the first output voltage reference and the first output current Io1 and the first output voltage Vo1 and output the first feedback signal VFB1 to the first main control unit 161. Similarly, the second output control unit 152 may generate a second feedback signal VFB2 according to the second output voltage reference and the second output current Io2 and the second output voltage Vo2, and output the second feedback signal VFB2 to the second main control unit 162. The embodiment of the present application is not limited herein.

In addition to the first flyback converter 131 and the second flyback converter 141, the adapter may also include other flyback converters. Each of the flyback converters is connected to a corresponding output port of the adapter through a corresponding switch. In this way, the adapter may also include three or more output control units, and each output control unit controls a switch correspondingly. In addition, the adapter may also include three or more main control units, and each main control unit controls operations of a flyback converter correspondingly. For example, each of the main control units is electrically connected with a corresponding flyback converter, receives a corresponding output feedback signal, and controls operations of the corresponding flyback converter according to the output feedback signal.

In some embodiments, the first output control unit 151 and the second output control unit 152 may be independent or integrated together. For example, the first output control unit 151 and the second output control unit 152 may be independent control chips. Or the first output control unit 151 and the second output control unit 152 may also be integrated in the same chip, that is, one chip can realize the functions of the first output control unit 151 and the second output control unit 152.

Figure 6:
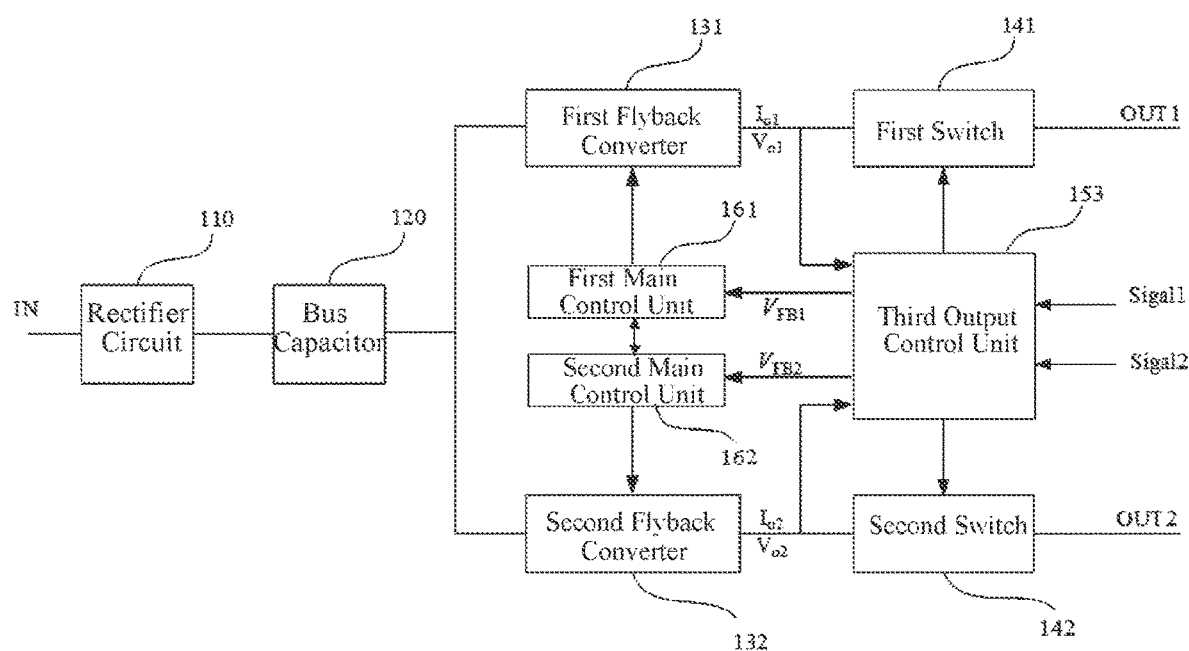
FIG. 6 is a schematic diagram of a circuit structure of an adapter according to another embodiment of the present invention.

In some embodiments, all switches may also be controlled by a same output control unit. As shown in FIG. 6, both the first switch 141 and the second switch 142 can be controlled by a third output control unit 153. The third output control unit 153 is connected with the output terminals of the first flyback converter 131 and the second flyback converter 132. The third output control unit 153 detects output currents and output voltages of the first flyback converter 131 and the second flyback converter 132 respectively, and receives load signals (e.g. Signal1, Signal2) reflecting different device requirements. The third output control unit 153 correspondingly outputs a first feedback signal VFB1 to the first main control unit 161 and a second feedback signal VFB2 to the second main control unit 162. Further, the first switch 141 and the second switch 142 can also be turned-on or turned-off under the control of the third output control unit 153.

Figure 7:
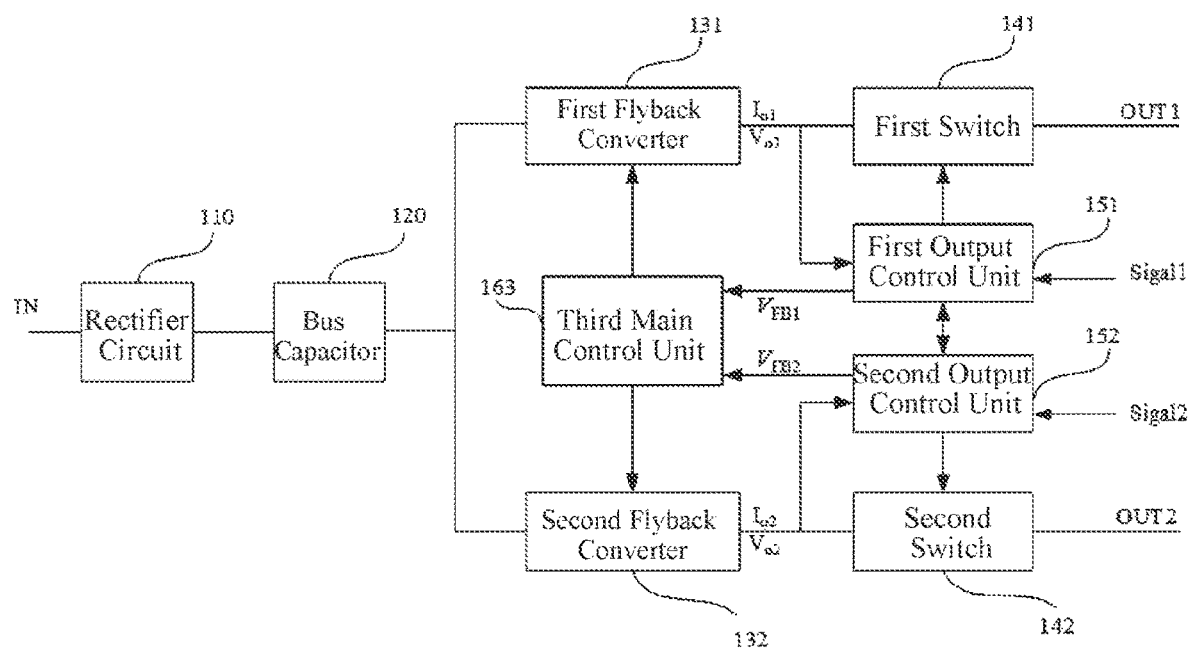
FIG. 7 is a schematic diagram of a circuit structure of an adapter according to another embodiment of the present invention.

Further, in some embodiments, all flyback converters may be controlled by a same main control unit. As shown in FIG. 7, the adapter includes a third main control unit 163. The third main control unit 163 is electrically connected with the first output control unit 151, the second output control unit 152, the first flyback converter 131 and the second flyback converter 132. The third main control unit 163 receives the first feedback signal VFB1 output by the first output control unit 151 and the second feedback signal VFB2 output by the second output control unit 152, and controls the operations of the first flyback converter 131 and the second flyback converter 132 according to the corresponding feedback signal.

Figure 8:
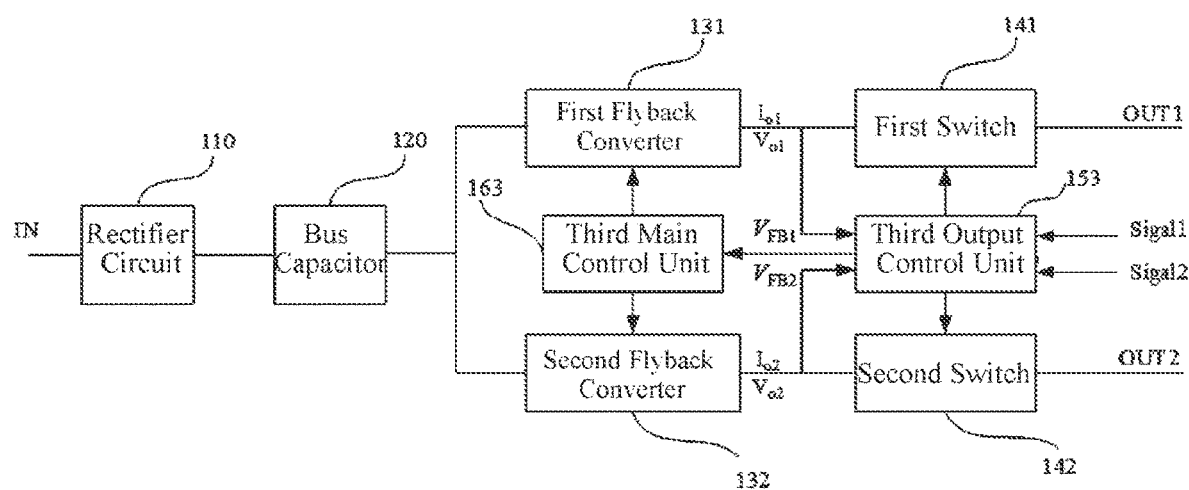
FIG. 8 is a schematic diagram of a circuit structure of an adapter according to another embodiment of the present invention.

In some embodiments, all flyback converters may be controlled by a same main control unit, and all switches may also be controlled by a same output control unit. As shown in FIG. 8, the adapter includes a third main control unit 163 and a third output control unit 153. The third main control unit 163 controls the operation states of the first flyback converter 131 and the second flyback converter 132. The third output control unit 153 controls on/off of the first switch 141 and the second switch 142.

In addition to the first flyback converter 131 and the second flyback converter 132, the adapter may also include other flyback converters. All of the flyback converters can be controlled by a same main control unit, and the main control unit is electrically connected to each of flyback converters. Similarly, all the switches at the output ports can also be controlled by a same output control unit. The embodiment of the present application is not limited herein.

Figure 9:
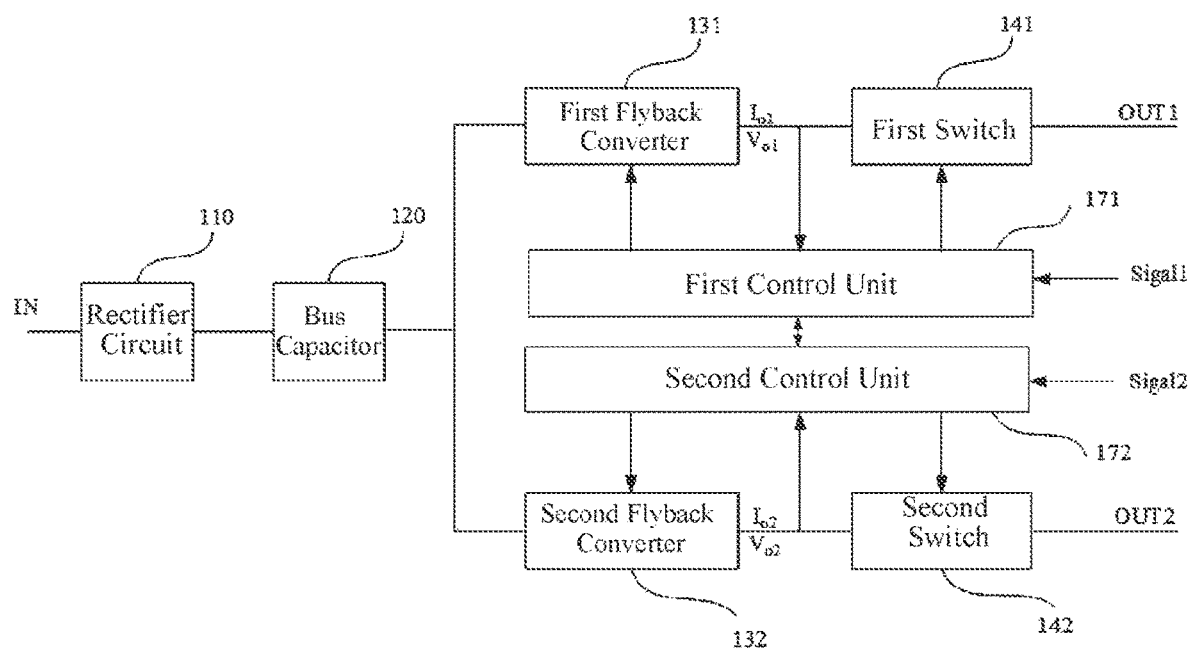
FIG. 9 is a schematic diagram of a circuit structure of an adapter according to another embodiment of the present invention.

In some embodiments of the present invention, the first flyback converter and the first switch may be controlled by a control unit, and the second flyback converter and the second switch may be controlled by a control unit. For example, as shown in FIG. 9, the adapter includes a first control unit 171 and a second control unit 172. The first control unit 171 is electrically connected with the first flyback converter 131 and the first switch 141, and the second control unit 172 is electrically connected with the second flyback converter 132 and the second switch 142. The first control unit 171 receives the first load signal Signal1, and detects output voltage Vo1 and output current Io1 of the first flyback converter 131. Furthermore, the first control unit 171 controls the first flyback converter 131 and the first switch 141. The second control unit 172 receives the second load signal Signal2 and detects output voltage Vo2 and output current Io2 of the second flyback converter 132. Furthermore, the second control unit 172 controls the second flyback converter 132 and the first switch 142. The first control unit 171 and the second control unit 172 communicate with each other and exchange operating information of their corresponding flyback converters, so that both of the first control unit 171 and the second control unit 172 know each other's output voltage, output power and other operating status information, etc. The communication mode between the first control unit 171 and the second control unit 172 can be any one of the following: SPI, I²C or USART. Alternatively, different control units can connect by way of a half-duplex communication or a full-duplex communication via General-Purpose Input/Output (GPIO) port. It should be noted that the communication method in the present invention is not limited to here.

In the embodiments of the present invention, the functions of the output control unit and the main control unit in the foregoing embodiments may also be implemented by a unified control unit. The unified control unit is electrically connected with the first flyback converter and the second flyback converter as well as the corresponding first switch and second switch thereof. The unified control unit receives the load signals, detects output voltages and output currents of the first flyback converter and the second flyback converter, calculates and generates the feedback signals accordingly, and then controls the first flyback converter and the second flyback converter according to the feedback signals. Furthermore, the unified control unit correspondingly controls on/off of the switches at the output ports by the output currents of the first flyback converter and the second flyback converter.

Figure 10:
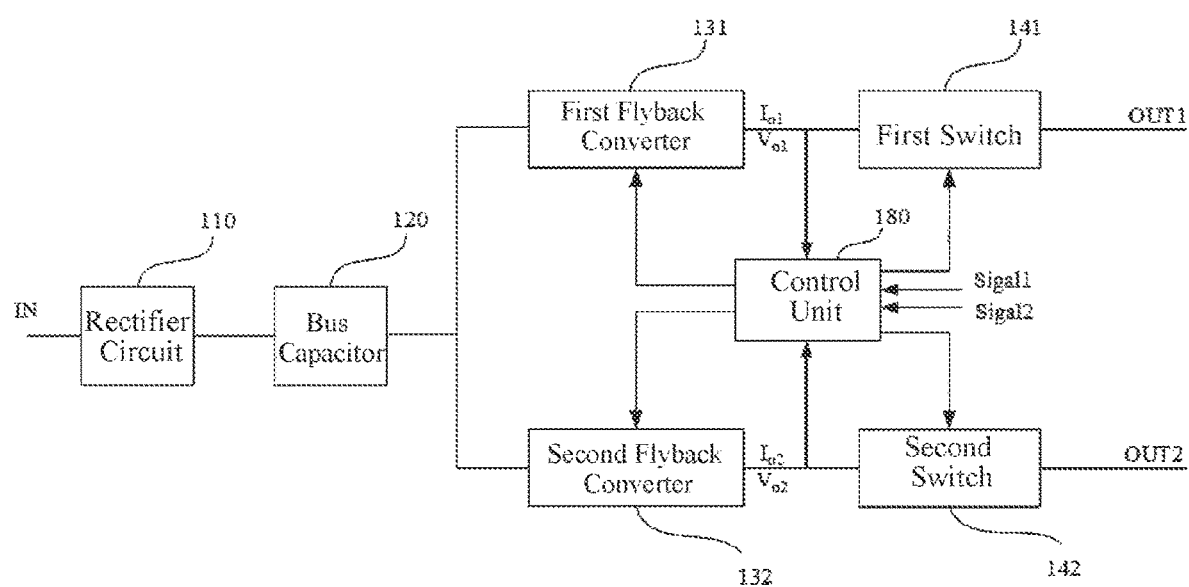
FIG. 10 is a schematic diagram of a circuit structure of an adapter according to another embodiment of the present invention.

For example, as shown in FIG. 10, the adapter includes a unified control unit 180, which is respectively connected to the first flyback converter 131, the second flyback converter 132, the first switch 141, and the second switch 142. The unified control unit 180 receives the first load signal Signal1 and the second load signal Signal2, and detects the first output current Io1 and the first output voltage Vo1 of the first flyback converter 131, as well as the second output current Io2 and the second output voltage Vo2 of the second flyback converter 132. In some embodiments, the unified control unit 180 may generate the first feedback signal and the second feedback signal according to the load signals Signal1, Signal2, and detected output voltages Vo1 and Vo2, and controls operations of the first flyback converter 131 and the second flyback converter 132 according to the corresponding feedback signals. In other embodiments, the control unit may calculate and generate corresponding feedback control signals based on the load signals Signal1, Signal2, detected output currents Io1, Io2, and detected output voltages Vo1, Vo2. Furthermore, the unified control unit 180 may also control on/off of the first switch 141 and the second switch 142 according to the first output current Io1 and the second output current Io2. The embodiment of the present application is not limited herein.

The embodiment of the present invention provides a control method for an adapter, wherein one of the first flyback converter and the second flyback converter is in operation, and the other is to be responded. In some embodiments, the flyback converter in operation can be considered a flyback converter whose output port is considered to meet power requirement firstly, and the flyback converter to be responded can be considered a flyback converter whose output port does not need to meet the power requirements firstly. For example, the method includes controlling an actual output power of the flyback converter to be responded, according to an actual output power of the flyback converter in operation, a rated output power of the adapter, and an expected output power of the flyback converter to be responded.

In the embodiment of the present invention, the actual output power of the flyback converter to be responded is calculated based on the actual output power of the flyback converter in operation and expected output power of the flyback converter to be responded and the rated output power of the adapter. In this way, the output power of different flyback converters can be flexibly set to adapt to electrical equipment with different electrical requirements.

In some embodiments, before the flyback converter to be responded is in operation, that is, when only one flyback converter is in operation, the output power of the flyback converter in operation is adjusted according to the load demand. At this time, the flyback converter in operation provides as much power as the load requires. However, it should be noted that the output power of the flyback converter in operation cannot be greater than the rated output power of the adapter.

Furthermore, if a sum of the actual output power $P_{o(OUT1)}$ of the flyback converter in operation and the expected output power $P_{exp(OUT2)}$ of the flyback converter to be responded is less than or equal to the rated output power Pe of the adapter, that is $P_{o(OUT1)}+P_{exp(OUT2)} \leq Pe$, the actual output power $P_{exp(OUT2)}$ of the flyback converter to be responded can be controlled to be equal to the expected output power $P_{exp(OUT2)}$. If the sum of the actual output power $P_{o(OUT1)}$ of the flyback converter in operation and the expected output power $P_{exp(OUT2)}$ of the flyback converter to be responded is greater than the rated output power Pe of the adapter, that is $P_{o(OUT1)}+P_{exp(OUT2)}>Pe$, the actual output power $P_{o(OUT2)}$ of the flyback converter to be responded can be controlled as the rated output power Pe of the adapter minus the actual value $P_{o(OUT1)}$ of the output power of the flyback converter in operation, that is, the $P_{o(OUT2)}=Pe-P_{o(OUT1)}$.

Figure 11:
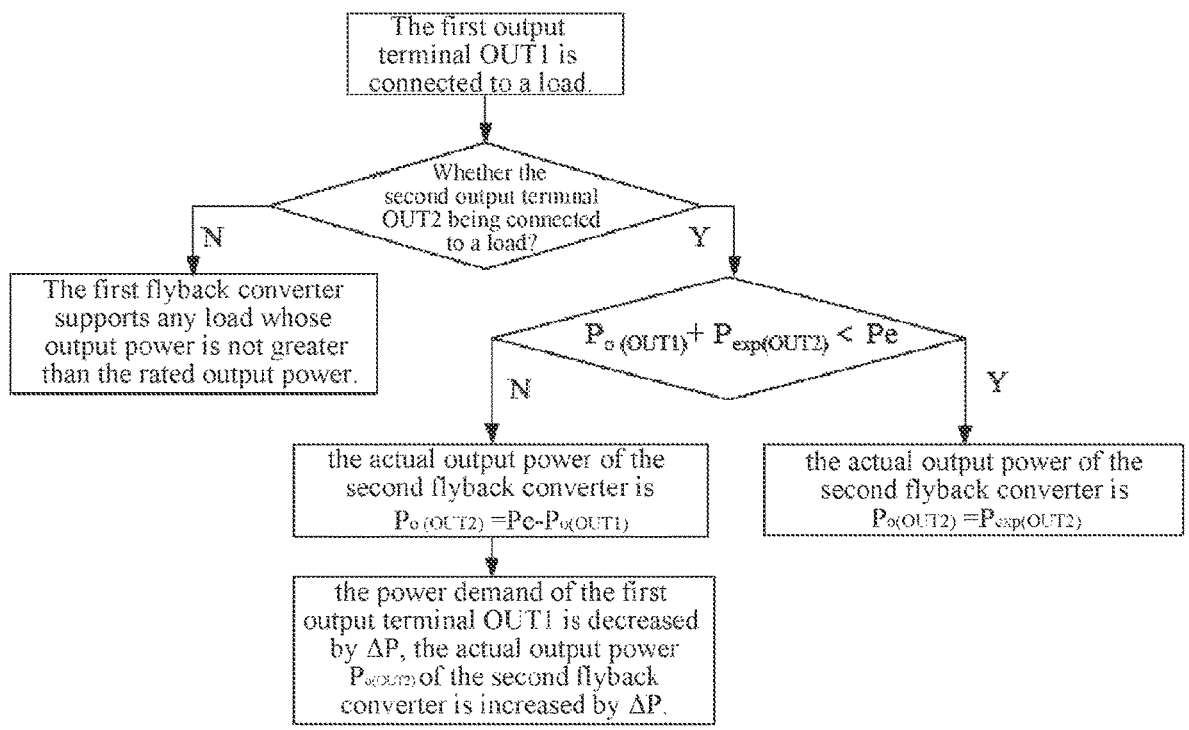
FIG. 11 is a flowchart of a method for controlling an adapter according to another embodiment of the present invention.

For example, taking the circuit structure of FIG. 5 as an example, assuming that the first output port OUT1 is connected with a load, that is, the first flyback converter 131 is first in operation, and the second output port OUT2 needs to be connected to the load. The second output control unit 152 receives the second load signal Signal2 and the first output control unit 151 and the second output control unit 152 communicate and exchange information with each other. For example, the second output control unit 152 confirms load demand of the second output port OUT2 according to the second load signal Signal2, for example, the expected output power $P_{exp(OUT2)}$. Further, the second output control unit 152 may receive information sent from the first output control unit 151, which indicates the output power $P_{o(OUT1)}$ of the first flyback converter at this time. For example, as shown in FIG. 11, the second output control unit 152 compares a sum of the actual output power $P_{o(OUT1)}$ of the first flyback converter and the expected output power $P_{exp(OUT2)}$ of the second flyback converter and the rated output power Pe of the adapter. If $P_{o(OUT1)}+P_{exp(OUT2)} \leq Pe$, the second main control unit 162 controls the actual output power $P_{o(OUT2)}$ of the second flyback converter to be equal to the expected output power $P_{exp(OUT2)}$. If $P_{o(OUT1)}+P_{exp(OUT2)}>Pe$, the second main control unit 162 controls the actual output power $P_{o(OUT2)}$ of the second flyback converter as the rated output power Pe of the adapter minus the actual output power $P_{o(OUT1)}$ of the first flyback converter, that is, the $P_{o(OUT2)}=Pe-P_{o(OUT1)}$.

Wherein, after the flyback converter to be responded is in operation, that is, when the two flyback converters work at the same time, the sum of the output powers of the two flyback converters cannot greater than the rated output power of the adapter.

Furthermore, in some embodiments, if power demand of the first load is decreased by ΔP, such that the actual output power $P_{o(OUT1)}$ of the first flyback converter is decreased by ΔP. In this case, if the output power of the second flyback converter does not reach the expected value, the reduced power can be allocated to the second load, that is, the actual output power $P_{o(OUT2)}$ of the second flyback converter may increase by ΔP. However, it is needed to ensure that $P_{o(OUT2)}$ does not exceed $P_{exp(OUT2)}$, and that $P_{o(OUT1)}+P_{o(OUT2)}$ is less than or equal to Pe. In other embodiments, in the case that both flyback converter are working normally, at this time, if one of the load demand increases, the system can allocate remaining power to that load, as long as that the sum of the actual output powers of the two flyback converters is not greater than the rated output power of the adapter.

In some other embodiments, if the sum of the actual output power $P_{o(OUT1)}$ of the flyback converter in operation and the expected output power $P_{exp(OUT2)}$ of the flyback converter to be responded is greater than the rated output power Pe of the adapter, the control unit can also reallocate output power of the flyback converter in operation. For example, the output power of the flyback converter in operation can be reduced to $P'_{o(OUT1)}$. At this time, the actual output power $P_{o(OUT2)}$ of the flyback converter to be responded can be controlled as the rated output power Pe of the adapter minus the reallocated actual output power $P'_{o(OUT1)}$ of the flyback converter, that is, $P_{o(OUT2)}=Pe-P'_{o(OUT1)}$. How much the output power of the flyback converter in operation is reduced and how to allocate the output power can be adjusted according to the actual situation, and the embodiment of the present application is not limited herein. In practice, the output power of output ports can be allocated according to the load type, load demand, etc., as long as a sum of the output power of a plurality of output ports does not exceed the rated output power of the adapter.

In the actual adapter application, the first output port and the second output port can be USB Type C interfaces, which can support USB PD2.0, USB PD 3.0 fast charging protocol, support 5V, 9V, 12V, 15V, 20V, have a maximum output current of 5 A, and support 100V-240V~50 Hz/60 Hz global voltage, taking into account most USB-C type mobile phones, notebooks, tablets, etc. For example, in one embodiment, it is assumed that the rated output power of the adapter is configured as 60 W, and the rated output power is not limited in the present application. Among them, the first output port OUT1 supports various load device requirements that do not exceed the rated total power of 60 W, and the second output port OUT2 supports various load device requirements that do not exceed the rated total power of 60 W.

In principle, under any conditions, a sum of the output powers of the two flyback converters cannot exceed a rated output power of the adapter. Furthermore, once a load is connected to one of the ports, other load connected later cannot obtain power from the front branch. In this way, it can be ensured that the flyback converter that have been in operation have a higher priority, and the load connected later cannot affect the flyback converter that is first in operation.

In an adapter and a control method thereof according to the embodiment of the present invention, a first flyback converter and a second flyback converter are provided in the adapter, and a first output port and a second output port of the adapter are respectively coupled to the first flyback converter and the second flyback converter, so as to realize independent adjustment of the output powers of the first output port and the second output port. And the output ports can meet the needs of different load devices, and the power of each output ports can be distributed flexibly. Further, two independent flyback converters share a set of rectifier circuit and bus capacitor, etc., and a topology structure thereof is simple. Furthermore, the simplified system architecture design of the present invention shortens product development time, and the modularization is beneficial to factory automation production.

Other embodiments of the present invention will be apparent to those skilled in the art in consideration of the specification and practice of the present invention disclosed herein. The present application is intended to cover any variations, uses, or adaptations of the present disclosure, which follow the general principles of the present invention and include common general knowledge or conventional technical measures in the art that are not disclosed in the present invention. The specification and embodiments are merely illustrative, and a true scope and spirit of the present invention is defined by the appended claims.

What is claimed is:

1. An adapter comprising an input port, a first output port and a second output port, and further comprising:
   a rectifier circuit having an input terminal being connected to the input port of the adapter;
   a bus capacitor directly and electrically connected to an output terminal of the rectifier circuit; and
   a first flyback converter having an input terminal connected to the bus capacitor and an output terminal coupled to the first output port; and,
   a second flyback converter having an input terminal connected to the bus capacitor and an output terminal coupled to the second output port.

2. The adapter according to claim 1, wherein a maximum output power of at least one of the first flyback converter and the second flyback converter is greater than a half of a rated output power of the adapter.

3. The adapter according to claim 2, wherein the first flyback converter provides a first output voltage and the second flyback converter provides a second output voltage; the first output voltage and the second output voltage are both adjustable.

4. The adapter according to claim 3, wherein the first output voltage and the second output voltage comprise 5V, 9V, 12V, 15V, 20V respectively.

5. The adapter according to claim 3, wherein the first output voltage is greater than, equal to, or less than the second output voltage.

6. The adapter according to claim 1, wherein when the first flyback converter and the second flyback converter work at the same time, a sum of the output power of the first flyback converter and the output power of the second flyback converter is not greater than a rated output power of the adapter.

7. The adapter according to claim 1, wherein the first flyback converter is connected with the first output port through a first switch, and the second flyback converter is connected with the second output port through a second switch.

8. The adapter according to claim 7, wherein the adapter comprises a first main control unit and a first output control unit, the first main control unit controls the first flyback converter, and the first output control unit controls the first switch; and the adapter comprises a second main control unit and a second output control unit, the second main control unit controls the second flyback converter, and the second output control unit controls the second switch.

9. The adapter according to claim 8, wherein,
   the first output control unit receives a first load signal, and sets a first output voltage reference according to the first load signal; and the first output control unit detects a first output voltage of the first flyback converter, and generates a first feedback signal according to the first output voltage reference and the first output voltage;
   the second output control unit receives a second load signal, and sets a second output voltage reference according to the second load signal; and the second output control unit detects a second output voltage of the second flyback converter, and generates a second feedback signal according to the second output voltage reference and the second output voltage;
   the first main control unit receives the first feedback signal, and generates a first driving signal according to the first feedback signal to control the first flyback converter; and
   the second main control unit receives the second feedback signal, and generates a second driving signal according to the second feedback signal to control the second flyback converter.

10. The adapter according to claim 8, wherein,
    when there is a load that needs to be connected to the first output port, the first output control unit controls the first switch to be turned off firstly, and then controls the first switch to be turned on when the first output voltage of the first flyback converter is adjusted to a required output voltage for the load; and
    when there is a load that needs to be connected to the second output port, the second output control unit controls the second switch to be turned off firstly, and then controls the second switch to be turned on when the second output voltage of the second flyback converter is adjusted to a required output voltage for the load.

11. The adapter according to claim 8, wherein the first output port meets a USB PD Type-C requirement and the second output port meets the USB PD Type-C requirement.

12. The adapter according to claim 8, wherein the first output control unit and the second output control unit communicate with each other, so as to exchange information of output voltages and output powers of their respective flyback converters.

13. The adapter according to claim 12, wherein a communication mode between the first output control unit and the second output control unit comprises SPI, $I^2C$ or USART; or the first output control unit and the second output control unit are connected in a half-duplex or full-duplex communication mode through a General-Purpose Input/Output (GPIO) port.

14. The adapter according to claim 8, wherein
    the first main control unit, the first output control unit, the second main control unit, and the second output control unit are independent or integrated together; or
    the first main control unit and the second main control unit are integrated together, and the first output control unit and the second output control unit are integrated together; or the first main control unit and the first output control unit are integrated together, and the second main control unit and the second output control unit are integrated together.

15. A control method for an adapter, the adapter comprising an input port, a first output port and a second output port, and further comprising:
- a rectifier circuit having an input terminal being connected to the input port of the adapter;
- a bus capacitor directly and electrically connected to an output terminal of the rectifier circuit; and
- a first flyback converter having an input terminal connected to the bus capacitor and an output terminal coupled to the first output port; and
- a second flyback converter having an input terminal connected to the bus capacitor and an output terminal coupled to the second output port;
- wherein one of the first flyback converter and the second flyback converter is in operation, and the other is to be responded; the method comprising:
- according to an actual output power of the flyback converter in operation, a rated output power of the adapter, and an expected output power of the flyback converter to be responded, calculating an actual output power of the flyback converter to be responded.

16. The control method according to claim 15, if a sum of the actual output power of the flyback converter in operation and the expected output power of the flyback converter to be responded is less than or equal to the rated output power of the adapter, the actual output power of the flyback converter to be responded is controlled to be equal to the expected output power.

17. The control method according to claim 15, if a sum of the actual output power of the flyback converter in operation and the expected output power of the flyback converter to be responded is greater than the rated output power of the adapter, the actual output power of the flyback converter to be responded to is controlled to be equal to the rated output power of the adapter minus the actual output power of the flyback converter in operation.

18. The control method according to claim 17, if the output power of the flyback converter that is in operation first decreases by $\Delta P$, the output power of the flyback converter that is in operation later increases by $\Delta P$, and make sure that the output power of the flyback converter that is in operation later is not greater than the expected output power.

19. The control method according to claim 15, if a sum of the actual output power of the flyback converter in operation and the expected output power of the flyback converter to be responded is greater than the rated output power of the adapter, the actual output power of the flyback converter in operation is reallocated, and the actual output power of the flyback converter to be responded is controlled to be equal to the rated output power of the adapter minus the reallocated actual output power of the flyback converter in operation.

20. The control method according to claim 15, after the flyback converter to be responded is in operation, a sum of the output powers of the two flyback converters is not greater than a rated output power of the adapter.

* * * * *